United States Patent Office 3,507,577
Patented Apr. 21, 1970

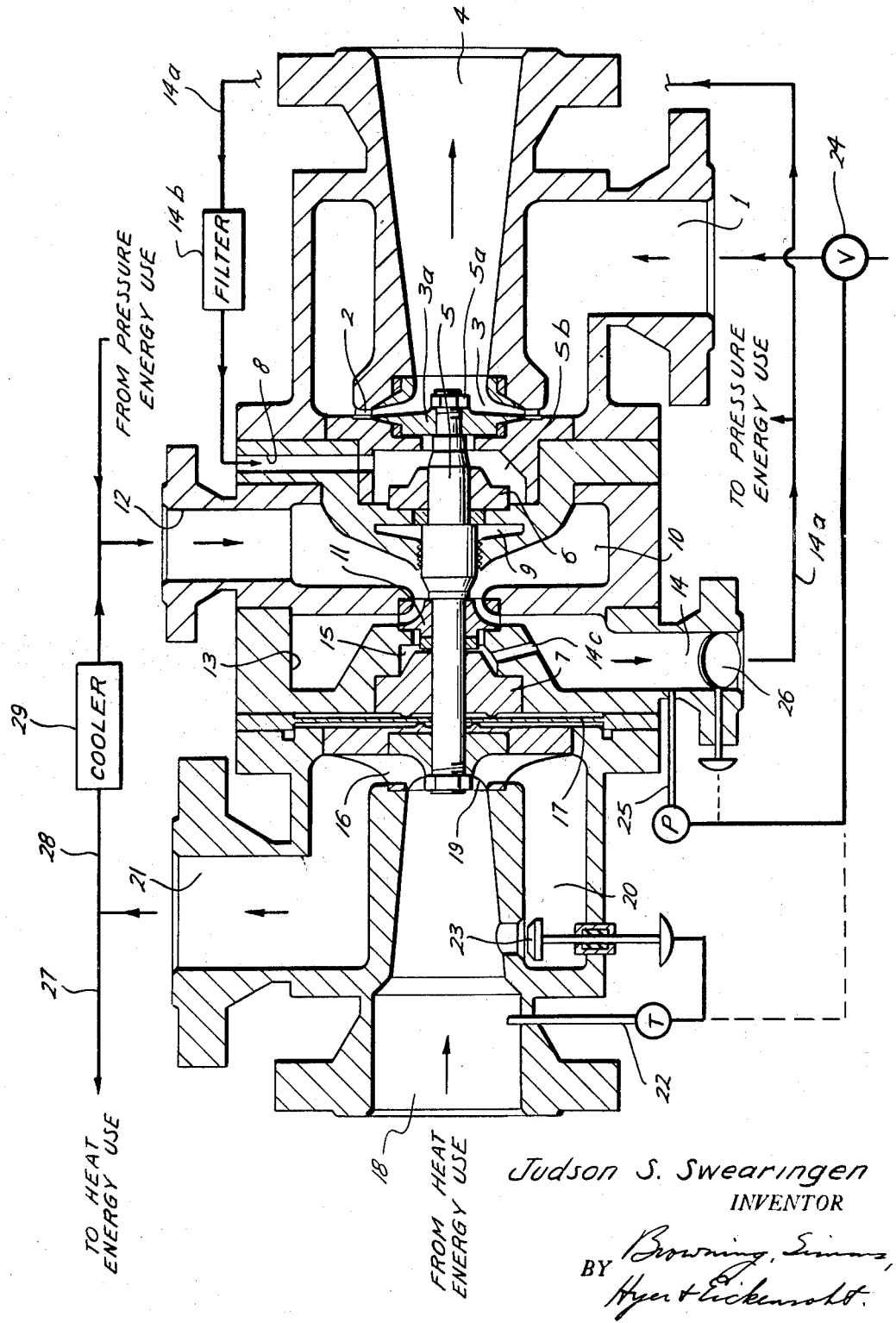

3,507,577
GAS EXPANSION AND HEAT AND PRESSURE
POWER GENERATING COMBINATION
Judson S. Swearingen, 500 Bel Air Road,
Los Angeles, Calif. 90064
Filed June 13, 1967, Ser. No. 645,670
Int. Cl. F04b 39/02, 39/06
U.S. Cl. 417—53  8 Claims

ABSTRACT OF THE DISCLOSURE

In accordance with this disclosure high pressure gas is expanded through an expansion turbine, the rotor of which is mounted on one end of a short power shaft. The other end of this shaft which is entirely enclosed within the composite housing of the two devices, carries a turbulator or paddle wheel adapted to produce a high degree of turbulence in a body of liquid therein. This device is adapted to operate at extremely high pressures and to have generated within the turbulator an extremely high temperature in a liquid located therein. Intermediate the turboexpander and the turbulator are mounted bearings for supporting the shaft, and an oil pump for supplying oil under pressure to produce flow through each of the bearings toward the turbulator and thereby resist the transfer of heat along the shaft and at the same time lubricate the bearings. The bearing which is closest to the turbulator, and the turbulator itself, are insulated from one another by means of a heat insulation or barrier wall so as to further inhibit the transfer of heat from the turbulator toward the bearings, pump and the like. Temperature and pressure sensors in the outputs from said turbulator and pump respectively control the energy output from each by operating valves controlling the flow therethrough or the flow through the turbine.

This invention relates to means and method for the conversion of fluid pressure energy into heat at a remote location.

More particularly, it refers to the use of an expansion turbine for adding heat to a stream of fluid.

In hazardous locations, such as platforms for offshore gas production, there is a serious problem of generating heat for carrying out certain operations such as the dehydration of natural gas without the use of open fire. Also there is often a need for heat for steam generation or the like as a desirable use of gas expansion energy. Furthermore, the gas is often expanded to generate refrigeration by doing work, so then the energy is available as a by-product to use for the stated purposes.

It is, therefore, an object of this invention to generate heat for carrying out desired heat consuming operations at remote and hazardous locations at which open fire is hazardous or otherwise undesirable and an adequate electrical supply unavailable, but at which an adequate supply of high pressure gas is available.

Another object is to generate heat in a liquid medium by means of expansion of high pressure gas while causing it to do mechanical work, and absorbing the mechanical energy so produced in a body of liquid thereby raising its temperature and heat content.

Another object of this invention is to generate heat in a liquid medium by means of expansion of high pressure gas while causing it to do mechanical work in the form of high speed rotation of a rotary machine, absorbing the mechanical energy from the high speed rotation portion of said machine into a liquid through a turbulator while avoiding destructive vibration of said high speed rotating portion and preventing excessive heat transfer from the turbulator to the expanding gas.

Another object is to generate heat in a liquid medium and at the same time produce hydraulic power.

Other objects and advantages of this invention will become apparent from the following description taken in connection with the accompanying drawing wherein is illustrated one embodiment of this invention.

In the drawing:

The single figure shows partially diagrammatically and partially in longitudinal cross section a machine constructed in accordance with this invention.

In the disclosed embodiment the objects of this invention are achieved by the use of a turboexpander for the expansion of natural gas or the like and the power so produced in the turboexpander is absorbed in a heat transferring liquid in a turbulence device, the fluid so heated being used as a heating medium for heating whatever is desired, and is circulated through the turbulence device in order to pick up heat therefrom. In addition to the generation of heat which in the preferred form is accomplished by means of such a turbulence device on the same shaft with and as close as possible to but still spaced from the turboexpander sufficiently to interpose therebetween a bearing and seal, and a heat shield, there is a centrifugal pump impeller therebetween which circulates a portion of the same liquid used for transfer of heat, whereby the pump uses some of the power from the expansion of gas and employs it to generate hydraulic power. Pressure generated in this liquid is preferably employed to circulate a small quantity of such liquid through the seal and heat shield adjacent the turbulator in the direction toward the turbulator so as to prevent the very hot liquid from the turbulator from flowing in the opposite direction into the pump through the seal and bearing and causing damage because of its high temperature. At the same time such cool liquid flowing through the bearing keeps the bearing assembly cool and lubricates the bearing.

Referring now more in detail to the drawing, the numeral 1 indicates the inlet opening of a turboexpander having nozzles 2 mounted so as to discharge gas passing into the inlet 1 into the passageways 3 through and toward the center of the rotor 3a and thence out through the gas outlet 4 of the turboexpander.

The rotor 3a is mounted on a shaft 5 and is secured thereon by means of a nut 5a or other suitable means. The shaft 5 passes through a chamber 5b in a direction away from the turboexpander rotor and through a bearing 6 serving as a support for the shaft. It is noted that this bearing constitutes a thrust bearing as well as a radial bearing and that the shaft 5 after passing therethrough passes adjacent its opposite end through a second bearing 7, thereby providing spaced bearing supports for the shaft.

Leading into the chamber 5b is a passageway 8 for the input of oil which, in a manner presently to be described, is maintained under pressure sufficient so that flow will take place therefrom along the shaft 5 in both directions. In the direction opposite from the turboexpander this oil enters an annular chamber 9 and thence is forced in very small quantities through a seal into an annular low pressure pump inlet chamber 10 from whence it is fed into the pump impeller 11. The annular space 10, in addition to the small quantity of oil leaking through the bearing 6 and the seal between the annular space 9 and the annular space 10, receives oil from an inlet 12, through which it is supplied in a manner presently to be described. From the pump impeller 11 the oil is thrown outwardly by centrifugal action into the annular high pressure pump outlet space 13 and thence out through the discharge from the pump at 14. Thence the bulk of pressurized oil will be conducted to a point where pressure energy is to be used. It will be seen that part of the oil going out through this discharge is caused to flow through a line 14a and circulate through a filter 14b and thence back in through the inlet 8 to supply the seal and bearing lubricating oil to the annular chamber 5b as just described. Thus pressure from the pump having the rotor 11 is employed to feed oil under pressure exceeding that at the pump intake and that in the turboexpander into the annular space 5b and provide the lubrication and seal oil as required. The high pressure oil in the annular space 13 is also forced into the annular space 15 through a passageway 14c and thence along the shaft 5 through the bearing 7 toward the end of the shaft opposite the turboexpander. Mounted on the opposite end of this shaft is a turbulator rotor 16 which causes turbulence in a liquid within the turbulator during operation of the device and hence imparts heat to such liquid. Devices of this character are frequently employed at extremely high speeds of operation such as, for example, 20,000 to 50,000 r.p.m. At these speeds, in order to absorb from several hundred to several thousand horsepower the turbulence generated is enormous and the temperatures of the oil so subjected to turbulence extremely high. In order to prevent these high temperatures from being conducted back through the parts of the device toward the interior of the oil pump which has the rotor 11, a heat shield 17 is provided between the interior of the turbulator and the bearing 7. This may be of any suitable well-known form for a sheet of partition type of heat insulating wall of which there are considerable numbers well known.

Oil is fed into such turbulator or heating device through an oil entrance 18 and thence passes through the turbulator rotor 19 and out through the outlet annulus 20 and the outlet 21.

The temperature of the incoming oil is constantly sensed by means of a suitable temperature sensing device 22, and this device is caused to produce a signal which in turn may actuate a control such as a valve or flow directing vanes 24 to control the mass input rate factors of volume or pressure of gas entering the turboexpander at 1. Then if the temperature of the incoming oil becomes warmer and it is desired to add less heat thereto, the sensing device 22 will cause a partial closing of the valve 24 until the gas being expanded in the turboexpander will not provide sufficient heat to overheat the oil coming into the oil turbulator at 18. On the other hand, the sensor may be arranged to control the opening of the valve 23 which allows recirculation of the heat transferring oil after it has once gone through the turbulator 19 to be bypassed back to the inlet of the turbulator and go through again thus acquiring additional heat. Thus the temperature may be maintained substantially constant in the turbulator.

There is also a pressure sensor 25 constantly sensing the pressure at the outlet 14 of the pump whose impeller is 11. This pressure sensor may likewise be connected to control the valve 24 or the like and thereby to control the amount of gas entering the turboexpander so that if the pressure at the outlet 14 becomes too high the amount of gas entering the turboexpander may be cut down and permit the pressure in the outlet 14 to fall. This same pressure sensor may instead be connected to control the pressure within the outlet 14 by means of regulation of the throttle valve 26 which controls flow through this outlet.

Oil from the heat generating turbulator is passed outwardly through the outlet 21 and through a line 27 to a point wherein the heat energy contained within it may be applied to some desired useful purpose, and a minor portion of this oil is passed through a line 28 to a cooler 29 and thence fed into the inlet 12 of the pump whose impeller is 11. This may be controlled to just replace the oil flowing along the shaft 5 from pump to turbulator.

Thus it will be ssen that the high pressure gas enters the turboexpander at 1 and passes radially inward through the turbine nozzles 2 and turbine rotor 3 and is discharged out through passage 4. The turbine rotor is mounted on a shaft 5 which is made as short as possible consistant with the parts which must be located along the shaft, being so made short in order to minimize vibration which can be a problem at the high speeds indicated with shafts of any great length.

The turbine rotor 3 is mounted on the shaft 5 and transmits rotational power to the shaft. The shaft 5 is mounted in combination journal and thrust bearings 6 and 7 which support and locate the shaft 5.

As above mentioned, the journal bearing 6 also acts as a shaft seal by having a sealing liquid supplied thereto, which liquid is also the lubricant introduced to bearing 6 through the passageway 8. Most of such liquid from passageway 8 leaks along the shaft 5 in a direction away from the turbine into the zones 9 and 10 which will normally be at substantially lower pressures than that within the passage 8.

The pump impeller 11 is mounted on the shaft and acts to take liquid from the inlet 12 which leads to the passage 10 and thence into the inlet of the impeller. The pump impeller 11 discharges into the compartment 13 and out through the discharge passage 14. The pressurized liquid in the chamber 13 flows into chamber 15, through passageway 14c wherein it lubricates the thrust faces of bearing 7 and then leaks through the journal of bearing 7, acting also as a seal, and on into the turbulator chamber 16.

The turbulator normally operates at high temperatures of the order of several hundred degrees Fahrenheit and the liquid therein is at such high temperature that if it reached the bearing 7 at such temperature it would be likely to be damaging thereto. For this reason there is provided a flow of sealing liquid through the bearing 7 in the direction of the turbulator to protect the bearing.

The heat barrier wall between the pump compartment and the tubulator compartment retains the heat in the tubulator and protects the hydraulic pump from this high temperature.

There is, of course, normally some leakage from both systems. This may be replaced by injection of new fluid through passageway 8 or otherwise into the pump intake which constitutes a continual addition of clean fluid to the two systems.

In some applications it is necessary to maintain a certain temperature of the circulating stream in the turbulator. The rate of temperature generation varies inversely with the rate of flow of liquid through the turbulator rotor. The temperature of such liquid is sensed by the probe 22 in the heating system and, as above mentioned, it may be used to control the bypass valve 23 to thereby control the rate of recirculation of liquid through the turbulator rotor 19 and thereby control the temperature rise generated by the rotor in the circulated liquid.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. The method of simultaneously converting partly into available heat energy and partly into pressure energy in a fluid medium the mechanical energy of a single rotating shaft having a turbulator and a pump mounted thereon adjacent one another to be operated by rotation of said shaft, comprising confining a body of fluid medium around said turbulator to be agitated and heated thereby, to provide available heat energy in said medium, simultaneously supplying another body of said medium to the intake of said pump and subjecting it to the action of said pump to raise its pressure to a pressure greater than the pressure of the body of fluid surrounding said turbulator thereby providing available pressure energy in said other body of medium, conducting an annular stream comprising a portion of the so pressurized medium along said shaft from said pump to the body of fluid being heated in said turbulator to protect said pump against high temperature fluid leakage from said turbulator along said shaft to said pump, and replacing the said portion of the said other body used to form said annular stream by withdrawing a sufficient quantity of heated fluid emerging from said turbulator, cooling the same to a temperature suitable for introduction into said pump, and mixing it with said other body of medium being supplied to the intake of said pump.

2. The method as set forth in claim 1 in which the medium is recirculated through the turbulator in quantity sufficient to prevent the temperature of medium emerging from the turbulator from rising above a predetermined value.

3. The method as set forth in claim 1 in which the rate of circulation of the medium through the turbulator is varied to maintain the temperature of the medium emerging therefrom at a desired value.

4. A machine for the production of available heat energy from gas under pressure comprising a gas pressure engine for expanding gas while causing it to do mechanical work, a turbulence device comprising a container adapted to contain a body of heat carrying fluid different from said gas, and an agitator therein for agitating such body to impart heat thereto, means extending through a wall of said container and closely non-engagingly embraced thereby and connecting said engine to said agitator to drive it with the mechanical work produced by the gas expanding in said engine, a heat insulating shield interposed between said engine and said container and surrounding said driving means, and a fluid pump located on said driving means between said engine and said turbulence device to be driven thereby and having its downstream portion in communication with the circumference of said driving means between said pump and said turbulence device to simultaneously induce flow of such heat carrying fluid along said driving means from said pump toward said turbulence device and cause the heat carrying fluid to absorb heat transmitted through said heat shield, and then flow through said container wall to the interior of said container and intermingle with the body of heat carrying fluid therein.

5. The method as set forth in claim 1 in which the shaft is driven by expansion of gas while causing it to impart rotation to said shaft, the temperature of fluid medium in said turbulator is sensed, and the pressure of gas supplied for such expansion is varied to maintain said temperature constant.

6. The method set forth in claim 1 in which the shaft is driven by expansion of gas while causing it to impart rotation to said shaft, the pressure of the medium at the output of said pump is sensed, and the pressure or flow of gas supplied for said expansion is varied to maintain said pressure of the medium constant.

7. The method as set forth in claim 1 in which the shaft is driven by expansion of gas while causing it to impart rotation to said shaft, the pressure of the medium at the output of said pump is sensed, and the rate of mass of gas expanded to impart rotation to said shaft is varied to maintain said pressure constant.

8. A machine as set forth in claim 4 in which said pump is located between said engine and said heat shield and said flow toward the turbulence device passes through said heat shield.

References Cited

UNITED STATES PATENTS

| | | | |
|---|---|---|---|
| 3,033,120 | 5/1962 | Williams | 103—87 |
| 3,054,554 | 9/1962 | Buchi | 230—209 |
| 3,171,354 | 3/1965 | Sohlemann | 103—87 |
| 2,475,316 | 7/1949 | Garraway | 253—39 |
| 2,804,021 | 8/1957 | Swearingen | 103—87 |
| 2,918,207 | 12/1959 | Moore | 253—39 X |
| 2,960,938 | 11/1960 | Williams | 103—111 |
| 3,038,318 | 6/1962 | Hanney. | |
| 2,804,021 | 8/1957 | Swearingen | 103—87 |
| 3,133,425 | 5/1964 | Hanney et al. | |

FOREIGN PATENTS 1,207,713  12/1965  Germany.

WILLIAM L. FREEH, Primary Examiner

U.S. Cl. X.R.

415—177; 417—373, 423